H. A. TUTTLE.
THRUST COLLAR.
APPLICATION FILED JUNE 9, 1911.

1,022,518.

Patented Apr. 9, 1912.

Witnesses
Cynthia Doyle
H. B. Davis

Inventor
Henry A. Tuttle
by Hayes & Harriman
attys.

COLUMBIA PLANOGRAPH CO., WASHINGTON, D. C.

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

THRUST-COLLAR.

1,022,518.  Specification of Letters Patent.  Patented Apr. 9, 1912.

Application filed June 9, 1911. Serial No. 632,134.

*To all whom it may concern:*

Be it known that I, HENRY A. TUTTLE, a citizen of the United States, residing at Taunton, in the county of Bristol and State of Massachusetts, have invented an Improvement in Thrust-Collars, of which the following is a specification.

In clutches and kindred devices, it has been common to employ as an actuating means, a sliding thrust-collar composed of two parts and having a circumferential groove, and a non-rotatable ring arranged in said groove provided with outwardly extended studs adapted to enter notches in the arms of a pivoted actuating-lever; also, it has been common to make the sliding thrust-collar of one piece having a circumferential groove and to arrange in said groove a non-rotatable yoke or inverted U-shaped member having outwardly extended studs arranged at the extremities thereof, adapted to be engaged by the actuating-lever. While the last form of thrust-collar is by far the strongest, yet the loose yoke which is usually employed is objectionable on account of its tendency to spring when pressure is exerted upon it by a movement of the actuating-lever during the operation of moving the thrust-collar.
This invention has for its object to provide a non-rotatable yoke adapted to be detachably arranged in the circumferential groove of a one-piece thrust-collar, with retaining-means slidably arranged on the shaft, to hold said yoke from springing when pressure is exerted upon it by the actuating-lever during the operation of moving the thrust-collar. Moreover, my improved device enables the employment of outwardly extended studs very much larger in diameter than the studs which are usually provided, either on a ring or yoke, which is advantageous.

The invention involves the employment of a locking or retaining-ring in connection with a non-rotatable yoke, which is adapted to be placed on and to engage the shaft on which the thrust-collar is mounted with a sliding fit, and which is connected with the yoke by short ties or bridges which are extended over the periphery of the end portion of the thrust-collar, at one side of the circumferential groove, and outwardly extended studs arranged on the ties or bridges at the extremities of the yoke.

Figure 1:
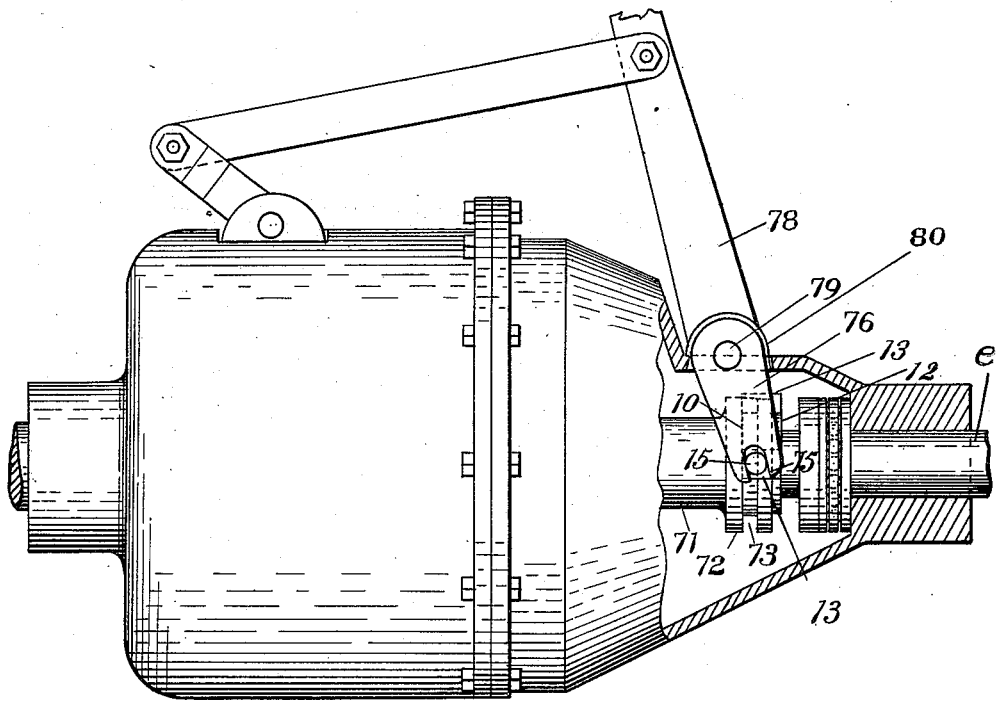
Figure 2:
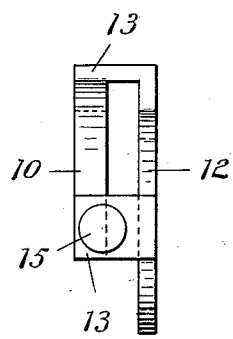
Figure 3:
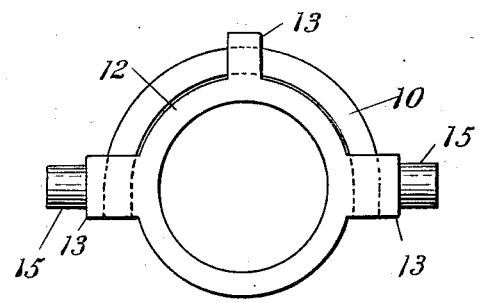
Figure 4:
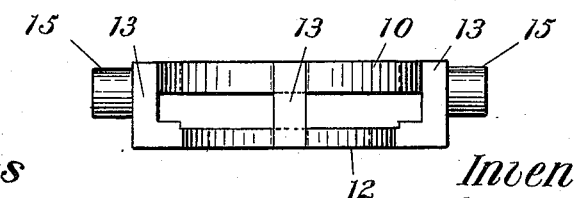

Figure 1 shows in side elevation a sliding thrust-collar and yoke embodying my invention, in connection with reverse-gearing, such for instance, as shown in my application for Letters Patent Serial No. 629,596. Fig. 2 is an enlarged side view of the yoke. Fig. 3 is a rear view, and, Fig. 4 is a plan view.

71 represents the sleeve or hub of a sliding one-piece thrust-collar 72, which latter is formed with a circumferential groove, and *e* represents the shaft on which said thrust-collar is mounted.

10 represents a semicircular yoke which is shaped to enter the circumferential groove in the thrust-collar and is made of a thickness corresponding to the width of said groove, so that when arranged therein, it fits said groove quite snugly to prevent it from rocking, yet permits free revolution of the collar.

12 represents a locking or retaining-ring having its inner diameter corresponding to the diameter of the shaft *e*, so as to be arranged on said shaft with a sliding fit. Said ring is connected with the yoke 10, by ties or bridges 13, three such bridges being here shown, and said bridges extend over the periphery of the end portion of the thrust-collar, at one side of the circumferential groove. Said bridges 13 are angularly formed, extending radially from the periphery of the retaining-ring for a short distance, and then at right angles thereto, in a direction toward and to the top or outer periphery of the yoke. The retaining-ring 12 is disposed in parallelism with the yoke, and the distance between said ring and yoke corresponds to the thickness of the end portion of the thrust-collar which is arranged between them, so that the thrust-collar is free to revolve while the yoke remains stationary, yet both the thrust-collar and yoke with its retaining-ring are free to slide together on the shaft. The outwardly extended studs 15, which are adapted to be engaged by the actuating-lever, are formed on the outside of the bridges 13, at the extremities of the yoke, and are made quite large in diameter, in fact, larger than the width of the yoke, this being made possible by the provision of the bridges on which they are formed. Said studs are adapted to enter notches 75 in the arm 76 of the actuating-lever 78, which is fulcrumed at 79, to ears 80 on a shell. Said yoke, retaining-ring, bridges and studs are or may be all made integral, such construction being preferable.

My improved yoke with retaining-ring, will be placed upon the thrust-collar before said collar is placed on the shaft $e$, and then said shaft is passed through the collar and ring, and when disposed therein it will be seen that the yoke is positively held from springing by the retaining-ring; furthermore, large studs are employed; and furthermore, when the thrust-collar is moved in the direction toward the left, Fig. 1, the yoke bears against a portion of the thrust-collar at the left of the circumferential groove and the ring bears against the end portion of said thrust-collar, thereby affording additional means to move the collar.

I claim:—

1. The combination with a rotatable sliding thrust-collar having a circumferential groove, adapted to be arranged on a shaft, of a non-rotatable semicircular yoke made of a width corresponding to the width of the groove in the thrust-collar, which is arranged in said groove, a circular ring of smaller diameter than the yoke adapted to be arranged on the shaft bearing the thrust-collar contiguous the rear end thereof, bridges connecting the extremities of said yoke with the ring and a bridge connecting an intermediate part of said yoke with the ring, all of said bridges being angularly formed and extending over the rear end portion of the thrust-collar, and studs projecting outwardly from the bridges at the extremities of the yoke adapted to be engaged by an actuating-lever, substantially as described.

2. The combination with a rotatable sliding thrust-collar having a circumferential groove, adapted to be arranged on a shaft, of a non-rotatable semicircular yoke made of a width corresponding to the width of the groove in the thrust-collar, which is arranged in said groove, a circular ring of smaller diameter than the yoke adapted to be arranged on the shaft bearing the thrust-collar contiguous the rear end thereof, bridges connecting the extremities of said yoke with the ring and a bridge connecting an intermediate part of said yoke with the ring, all of said bridges being angularly formed and extending over the rear end portion of the thrust-collar, and studs projecting outwardly from the bridges at the extremities of the yoke adapted to be engaged by an actuating-lever, said studs being made of a diameter greater than the width of the yoke, substantially as described.

In testimony whereof, I have signed my name to this specification, in the presence of two subscribing witnesses.

HENRY A. TUTTLE.

Witnesses:
B. J. NOYES,
H. B. DAVIS.

---

Copies of this patent may be obtained for five cents each, by addressing the "Commissioner of Patents, Washington, D. C."